United States Patent [19]

Hunter et al.

[11] Patent Number: 6,084,321

[45] Date of Patent: Jul. 4, 2000

[54] CONDUCTING POLYMER DRIVEN ROTARY MOTOR

[75] Inventors: Ian W. Hunter; Serge R. Lafontaine, both of Lincoln; John D. Madden, Somerville, all of Mass.

[73] Assignee: Massachusetts Institute of Technology, Cambridge, Mass.

[21] Appl. No.: 09/130,500

[22] Filed: Aug. 7, 1998

Related U.S. Application Data

[60] Provisional application No. 60/055,457, Aug. 11, 1997.

[51] Int. Cl.⁷ ...................................................... H02K 7/06
[52] U.S. Cl. .............................. 310/20; 310/367; 310/369
[58] Field of Search ............................. 310/26, 311, 339, 310/367, 369, 20, 80

[56] References Cited

U.S. PATENT DOCUMENTS 4,075,847  2/1978  Ray ............................................ 60/527
4,598,550  7/1986  Abbott ..................................... 60/641.8

FOREIGN PATENT DOCUMENTS

| 0 547 580 | 6/1993 | European Pat. Off. . |
| 1 343 024 | 2/1964 | France . |
| 405474 | 11/1924 | Germany . |
| 195 14 263 | 10/1996 | Germany . |

*Primary Examiner*—Nestor Ramirez
*Assistant Examiner*—Judson H. Jones
*Attorney, Agent, or Firm*—Bromberg & Sunstein LLP

[57] ABSTRACT

A rotary actuator for applying torque to a crank with respect to a member. The rotary actuator has a substantially planar sheet of anisotropic conducting polymer, portions of which are activated in temporal sequence to produce rotation of the crank with respect to the axis of the crank. Actuation is achieved by contraction of successive portions of the sheet as electrical current causes differential strain in the sheet.

7 Claims, 1 Drawing Sheet

CONDUCTING POLYMER DRIVEN ROTARY MOTOR

The present application claims priority from U.S. provisional application number 60/055,457, filed Aug. 11, 1997, which is herein incorporated by reference.

This invention was made with government support under Grant Number N00014-94-0787 awarded by the Department of the Navy. The government has certain rights to the invention.

TECHNICAL FIELD

The present invention pertains to an apparatus for providing torque by means of either a plurality of conducting polymer contractile members, or by a single conducting polymer contractile member exhibiting anisotropic material properties.

BACKGROUND OF THE INVENTION

Combustion engines are currently favored as the means of propulsion for automobiles and many other motorized vehicles. The combustion engine's main attribute is its tremendous power to mass ratio (1 kW/kg). One drawback of these engines is their limited efficiency. Furthermore, gear boxes are required because optimum torque is delivered only in a narrow range of operation. The use of gear boxes increases mass and reduces efficiency. Also, there is a limited ability to divide the torque delivered to each wheel, thus, in order to supply each wheel with the requisite torque, each wheel, ideally, would have to be fitted with its own direct drive motor. In the case of combustion engines, this is not an attractive solution. Indeed, direct drive combustion engines are not feasible because of the limited range of angular velocities over which torque is effectively delivered.

Electric motors offer an attractive alternative to combustion engines due to their high electrical to mechanical efficiencies, and negligible emissions. On the other hand, however, they suffer from very low torque to mass ratios.

Shape memory allow actuators and conducting polymer actuators offer very high force-to-mass and power-to-mass ratios such as required for effective direct drive motors. Conducting polymers actuators, the subject of the present invention, are expected to produce power densities of the order of 100 kW/kg and are potentially much more efficient than shape memory alloy actuators.

Conducting polymers feature a conjugated carbon backbone. Some common conducting polymers are polyaniline, polypyrrole and polyacetylene. These materials are semiconductors. However, upon oxidation or reduction of the polymer, conductivity is increased. The oxidation or reduction leads to a charge imbalance, which in turn results in a flow of ions into the material in order to balance charge. These ions or dopants enter the polymer from a surrounding, ionically conductive, medium, such as a gel, a solid electrolyte or a liquid electrolyte. If ions are already present in the polymer when it is oxidized or reduced, they may exit. The mass transfer of ions both in and out of the material leads to a contraction or expansion of the polymer. Typical volume changes are on the order of 10%, and linear dimensional changes are hence on the order of 3%. It is thought that oxidation and reduction may also lead to electrostatically and chemically induced changes in backbone dimension, which in turn lead to dimensional changes. Given the stiffness of the polymers, it is expected that stresses of up to 200 MPa, about 800 times greater than those generated by human muscle, will be possible. Currently the maximum stresses observed are on the order of 20 MPa. Bandwidths of 10 kHz are anticipated in conducting polymer actuators, although those observed to date are limited to 60 Hz.

SUMMARY OF THE INVENTION

In accordance with one aspect of the invention, in a preferred embodiment, the linear displacement and forces generated by conducting polymer actuator material is converted into angular displacements and torques. There is provided a rotary actuator for applying torque to a member with respect to a crank. The rotary actuator has a circular sheet of anisotropic conducting polymer coupled substantially at the center of the sheet to the crank and coupled at the periphery of the circular sheet to the member. The rotary actuator also has a controller for activating portions of the sheet in temporal phase such that a radius vector directed between the center of the sheet and the center of the crank executes a rotation about the center of the sheet.

A rotary actuator according to claim 1, wherein the anisotropic conducting polymer is chosen from among the group of polyaniline, polypyrrole, polythiophene and polyacetylene.

In accordance with alternate embodiments of the invention, the rotary actuator may also have an electrolyte in electrical contact with the sheet, where the electrolyte may be an aqueous solution of an acid chosen from the group of $HBF_4$, Hcl, HF, and $H_2SO_4$. Additionally, the rotary actuator may have a counterelectrode in electrical contact with the electrolyte for establishing an electrical potential of the sheet with respect to the electrolyte.

BRIEF DESCRIPTION OF THE DRAWING

The invention will more readily be understood by reference to the following description taken with the accompanying drawing which is a schematic view from the top of a rotary actuator comprised of a single conducting polymer sheet, a crank and an outer member, in accordance with a preferred embodiment of the invention. The drawing is intended to provide a better understanding of the present invention, but is in no way intended to limit the scope of the invention.

DETAILED DESCRIPTION OF SPECIFIC EMBODIMENTS

Figure 1:
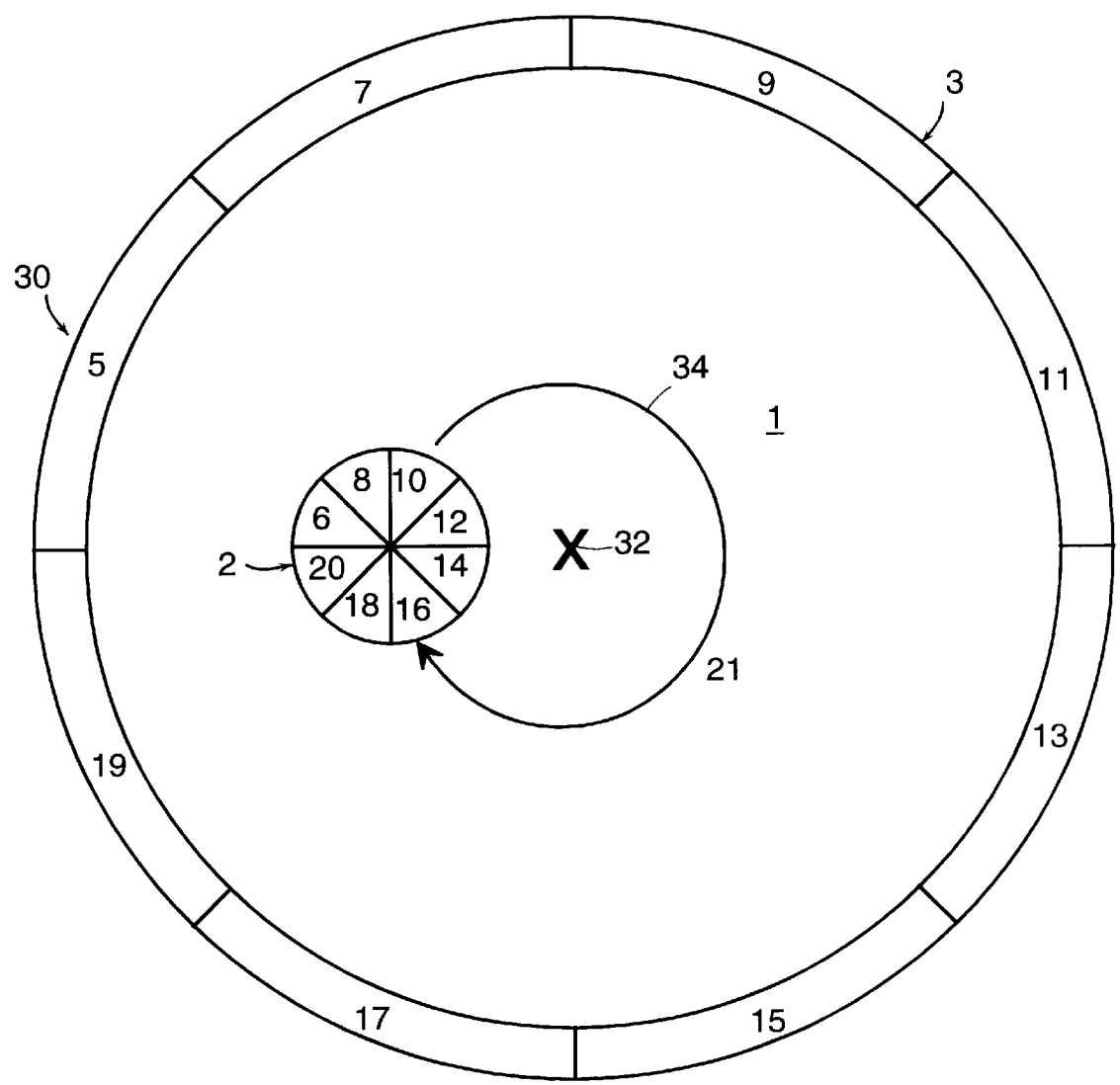

Stretch alignment of polymers in known to lead to material anisotropy, both mechanical, optical and electrical. Conductivity can be very high along the stretched axis, and one or more orders of magnitude lower perpendicular to that direction. The electrical anisotropy is key to one embodiment of the present invention.

Referring to FIG. 1, a schematic of an embodiment of a rotary actuator in accordance with the present invention is shown as designated generally by the numeral 30. A polymer film 1 is stretched between a crank 2 and an annulus 3 which constitutes the outer member of actuator 30. Polymer film 1 is preferrably polyaniline, although other conducting polymers, such as polypyrrole, polythiophene, polyacetylene, and their derivatives, may be used. For illustrative purposes, polymer sheet 1 is shown to be disk shaped, however other planar or even three-dimensional shapes may be used in accordance with various embodiments of the invention and are within the scope of any appended claims.

Due to the anisotropic treatment of polymer sheet 1, the electrical conductivity of the sheet can be made to be anisotropic, as is known to persons skilled in the art of polymer engineering. In particular, and by way of example, the conductivity may be caused to be higher in the radial direction of sheet 1 (namely the direction between center 32 of the sheet and the periphery of sheet 1 adjacent to annulus 3) as compared to the conductivity in the perpendicular direction. Numerals 5, 7, 9, 11, 13, 15, 17, and 19 designate sections of outer member 3. Numerals 6, 8, 10, 12, 14, 16, 18, and 20 designate sections of crank 2. Each of the sections designated by numerals from 5 to 20 are electrical contacts to polymer sheet 1. In a preferred embodiment of the invention, the entire rotary actuator 30 is immersed in an electrolyte containing ions that will, upon oxidation or reduction of the polymer, enter or exit polymer 1 and result in an expansion or contraction. A counter electrode (not shown) is present in the solution, against which all other potentials are applied. A preferred electrolyte for use with polyaniline is a 1 M aqueous solution of $HBF_4$, or, alternatively, Hcl, HF, $H_2SO_4$, or other acids.

The rate of actuator strain is proportional to the current applied between the sheet and the counter electrode, where the strain to charge density ratio is in the range of 25 to 1000 $C^{-1}m^3$. Alternatively, activation can be voltage controlled, in which case the potential operating range is from −0.4 V to +0.3 V when referenced to a Ag/AgCl reference electrode.

The electrolyte may also be an alternative to aqueous solution, namely ionically conducting polymers (such as Nafion, produced by E. I. du Pont de Nemours and Co., Inc.) or gels such as agar or PMMA-based gel. More generally, gels and solvents in which the aforesaid acids are soluble are within the scope of the invention. With polypyrrole, the use of aqueous or propylene carbonate solutions of various ions such as tetraethylammonium hexafluorophosphate, sodium dodecylbenzenesulfonate, or other salts, is preferred; these salts may also be used with gels and ionically conductive polymers, as described above.

In the state shown in FIG. 1 an electrochemical potential has been applied between the counter electrode and the radial sections 5 and 6. Since conductivity is anisotropic in the sheet 1, being highest in the radial direction, most of the oxidation or reduction resulting from the applied potential occurs in the section of sheet 1 between segments 5 and 6. The film 1 is hence contracted between sections 5 and 6, resulting in the eccentric position of the crank 2 relative to the center 32 of polymer sheet 1 and the outer member 3.

During the time increment succeeding the one depicted in FIG. 1, an electrical potential is applied, by means of a controller (not shown), in accordance with standard methods of electrical control, to sections 7 and 8 (relative to the counter electrode) in order to induce contraction of the portion of the sheet 1 lying between sections 7 and 8, while the potential applied to sections 5 and 6 is altered such that the portion of film between sections 5 and 6 relaxes. The center crank 2 is thereby caused to rotate along closed path 34 in the direction shown by arrow 21. By continuing the activation and deactivation sequence in a clockwise direction, crank 2 is moved eccentrically about center 32 of sheet 1 in a clockwise direction.

The motion of crank 2 about center 32 is readily converted, by means of an epicyclic gear, by way of example, or otherwise, to relative circular motion of member 3 about an axis passing through the center 32. Such conversion is a matter readily apparent to persons of ordinary skill in the mechanical arts.

An additional feature of the invention is the possibility of inducing forces on crank 2 relative to annular member 3 which might compensate for unusual stresses due to use of the actuator as a wheel on an irregular surface, for example.

While the invention has been described in detail, it is to be clearly understood that the same is by way of illustration and example and is not to be taken by way of limitation. Indeed, numerous variations and modifications will be apparent to those skilled in the art. All such variations and modifications are intended to be within the scope of the present invention as defined in the appended claims.

We claim:

1. A rotary actuator for applying torque to a crank with respect to a member, the crank having an axis of rotation, the rotary actuator comprising:

a. a substantially planar sheet of anisotropic conducting polymer having a center and a periphery, the center of the sheet coupled to the crank and the sheet coupled at the periphery of the sheet to the member; and b. a controller for activating portions of the sheet in temporal phase such that a radius vector directed between the center of the sheet and the axis of the crank executes a rotation with respect to the axis.

2. A rotary actuator according to claim 1, further comprising an electrical current source for supplying current for causing sequential portions of the sheet to contract in temporal phase.

3. A rotary actuator according to claim 1, wherein the anisotropic conducting polymer is chosen from among the group of polyaniline, polypyrrole, polythiophene and polyacetylene.

4. A rotary actuator according to claim 1, further including an electrolyte in electrical contact with the sheet.

5. A rotary actuator according to claim 4, wherein the electrolyte is an aqueous solution of an acid chosen from the group of $HBF_4$, Hcl, HF, and $H_2SO_4$.

6. A rotary actuator according to claim 4, further including a counterelectrode in electrical contact with the electrolyte for establishing an electrical potential of the sheet with respect to the electrolyte.

7. A wheel having a rim for causing locomotion of a vehicle, comprising:

a. a sheet of anisotropic conducting polymer, the sheet having a center and a periphery, the sheet coupled substantially centrally to a crank and coupled at the periphery of the sheet to the rim; and b. a controller for activating portions of the sheet in temporal phase such that a radius vector directed between the center of the sheet and the center of the crank executes a rotation about the center of the sheet.

* * * * *

UNITED STATES PATENT AND TRADEMARK OFFICE
CERTIFICATE OF CORRECTION

| | | |
|---|---|---|
| PATENT NO. | : 6,084,321 | Page 1 of 1 |
| APPLICATION NO. | : 09/130500 | |
| DATED | : July 4, 2000 | |
| INVENTOR(S) | : Hunter et al. | |

It is certified that error appears in the above-identified patent and that said Letters Patent is hereby corrected as shown below:

Col. 1, line 3, insert the following:
-- This invention was made with government support under Grant Number N00014-94-1-0787 awarded by the Office of Naval Research. The government has certain rights in the invention. --

Signed and Sealed this
Twenty-first Day of February, 2012

David J. Kappos
*Director of the United States Patent and Trademark Office*